March 28, 1950 — J. S. DONAL, JR — 2,502,077

AMPLITUDE MODULATION

Filed Nov. 30, 1948 — 3 Sheets-Sheet 1

AMPLITUDE MODULATION SYSTEM WITH SHUNT LOAD

POWERS IN AMPLITUDE MODULATION SYSTEM WITH SHUNT LOAD

INVENTOR
John S. Donal, Jr.
BY Harry Tunick
ATTORNEY

March 28, 1950 J. S. DONAL, JR 2,502,077
AMPLITUDE MODULATION
Filed Nov. 30, 1948 3 Sheets-Sheet 2
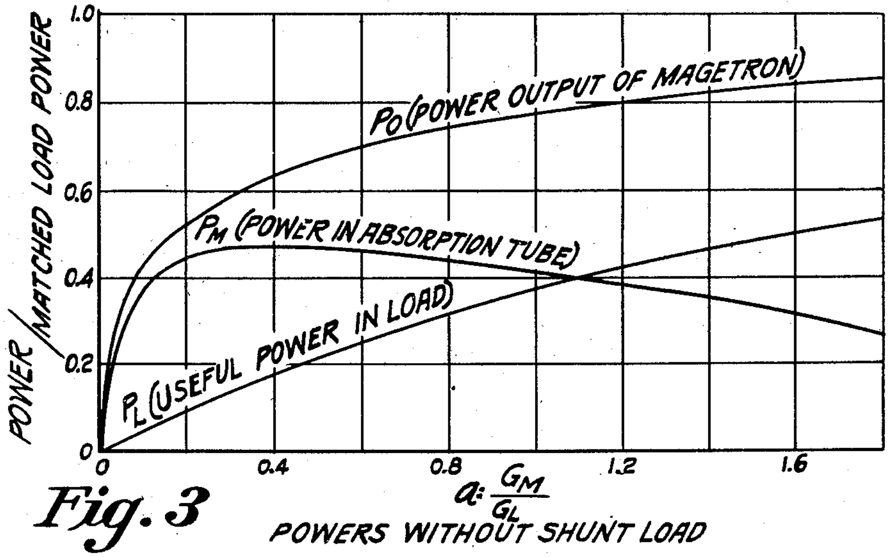
Fig. 3 POWERS WITHOUT SHUNT LOAD
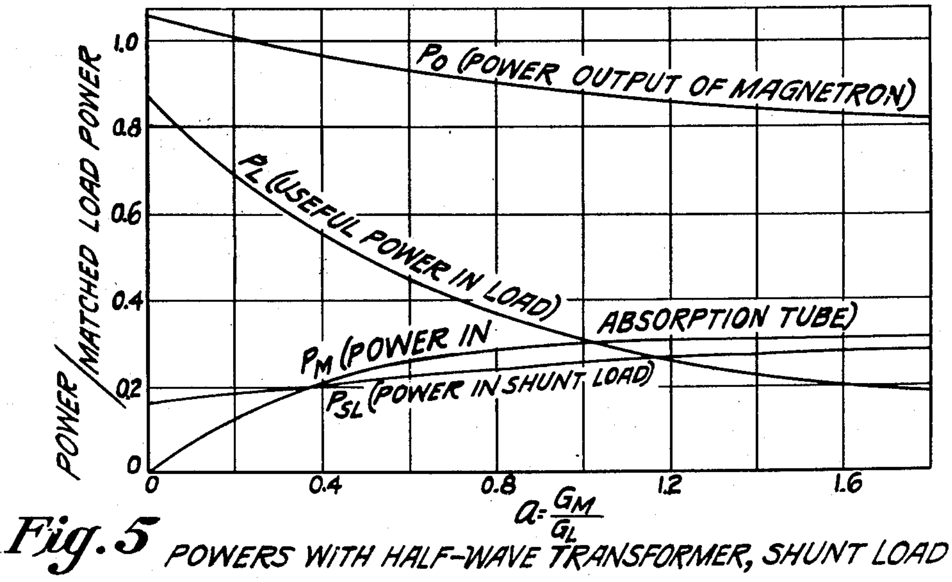
Fig. 5 POWERS WITH HALF-WAVE TRANSFORMER, SHUNT LOAD
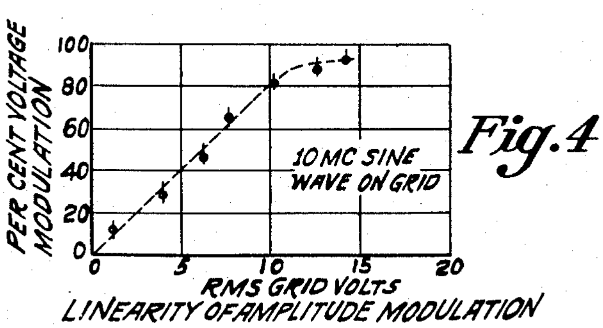
Fig. 4
LINEARITY OF AMPLITUDE MODULATION
INVENTOR
John S. Donal, Jr.
BY Harry Tunick
ATTORNEY

POWERS WITH HALFWAVE TRANSFORMER, NO SHUNT LOAD

RIEKE DIAGRAM OF 1KW. MAGNETRON

INVENTOR
John S. Donal, Jr.
BY Harry Tunick
ATTORNEY

Patented Mar. 28, 1950

2,502,077

UNITED STATES PATENT OFFICE 2,502,077

AMPLITUDE MODULATION

John S. Donal, Jr., Princeton, N. J., assignor to Radio Corporation of America, a corporation of Delaware Application November 30, 1948, Serial No. 62,776

16 Claims. (Cl. 332—55)

In this application, there is disclosed a new and improved method of and apparatus for modulating the amplitude of oscillatory energy. The oscillatory energy being modulated may be of any frequency, but this invention is particularly suitable for modulating high frequency energy, of the order of 1000 megacycles per second or higher, in accordance with signals. The modulation may represent voice or the like, facsimile or the like, video signals or sound.

It is well known that the modern C-W magnetron is an efficient oscillator capable of producing high radio frequency powers. Thus, a kilowatt or more of power has been obtained at 10,000 megacycles, several kilowatts at 3000 megacycles, and tens of kilowatts at 1000 megacycles or below, all at efficiencies of 50% to 80%. Modulation of magnetrons by means other than pulsing has been difficult, however. For example, variation of anode voltage for obtaining either amplitude or frequency modulation usually results in an undesirable mixture of the two, and, in addition, requires high modulator power.

An object of this invention is to provide an improved method of and means for modulating the magnitude of the oscillatory energy output of a magnetron tube oscillator. A more specific object of the invention is to provide an improved electronic method and apparatus for modulating the amplitude of oscillatory energy, such electronic modulator being particularly adaptable to produce amplitude modulation of the output of a magnetron oscillator operating at high frequencies.

Amplitude-modulated magnetrons are known in the art, and this invention does not make claim to the same broadly. However, in the known systems the amplitude modulation is usually accompanied by considerable undesired frequency modulation. A further object of this invention is to provide a simplified electronic modulator for a magnetron oscillator, wherein the amount of undesired concomitant frequency or phase modulation is so little that it may be disregarded.

The need for such a system will be apparent to those skilled in the art. For example, in certain broadcasting services such as television, amplitude modulation has been judged to be more desirable than frequency modulation, because of multipath difficulties encountered with the latter. At frequencies of several thousand megacycles, frequency modulation has usually been preferred for communication purposes; however, although frequency modulation has outstanding advantages as regards signal-to-noise ratio and automatic gain control, it has often been the case, also, that this form of modulation was the only one available. Either sufficient amplitude-modulated power was not available, or the attendant frequency modulation made its use impractical. Therefore, it appears that the herein-disclosed method of and means for amplitude-modulating magnetrons will prove useful when and where economy of band width is desirable.

As an example, the method and apparatus described herein was applied to a 900-megacycle magnetron oscillation generator, this rather low frequency being chosen because an oscillator of such frequency was available when the investigation was started, and because of the conveniently large dimensions of the modulation tube at that frequency. About 500 watts of amplitude-modulated power were obtained in this investigation, but the method is applicable up to at least several kilowatts. Even with the changes in geometry necessary at the higher frequencies, powers of a kilowatt or more, at 3000 megacycles, should be obtainable.

An outstanding advantage of the system at any frequency is the low modulating power required, less than one watt being required to modulate a half-kilowatt with a band width of ten megacycles.

In its broadest aspect, the improved modulator of this invention comprises a magnetron oscillation generator, a load impedance such as an antenna, and a main wave guide or coaxial line or the like transmission line, which couples the magnetron oscillator to the load to feed power thereto. To modulate the power, the main transmission line or the like is branched at a point $(2n+1)\lambda 4$ from the generator, where $n$ is an integer greater than zero, and the branch line extends to the resonant circuit or cavity of a spiral electron beam tube, the beam of which is subjected to a strong magnetic field the axis of which is parallel to the axis of the spiralling beam. The oscillatory energy generated by the magnetron is coupled to the resonant circuit or cavity and is absorbed in amounts depending upon the conductance of the spiral beam tube, which in turn is directly proportional to the beam current in such tube. The branch line is of a length $n\lambda/4$, $n$ being an integer greater than zero and being an odd number in the preferred embodiment and an even number in an alternative embodiment. The beam current in the spiral beam tube is controlled by the modulation, which may be applied to the grid of the spiral beam tube. When the beam is off, and the branch line is λ/4 or an odd multiple thereof in electrical length, the conductance of the tube is low and the junction point of the branch and the main lines is in effect nearly short-circuited because of the impedance-inverting property of the branch line. When the beam is on, the $G_M$ or conductance of the beam tube is very high and the junction point of the main and branch lines is effectively open-circuited. If the branch line electrical length is λ/2 or a multiple thereof, the effect of the modulation on the impedance is reversed. The length of the line or the like from such junction point to the load is not critical if line-to-load matching is provided.

It will be obvious that as shown more in detail and mathematically hereinafter, when the branch line has an electrical length of λ/4 or an odd multiple thereof, and the absorption tube impedance is high (low $G_M$), the junction of the main line and branch line is of very low impedance (i. e., nearly a short-circuit) giving a very high impedance at the magnetron because of the odd number of quarter-wavelengths of line between such junction and the magnetron, and this condition, at minimum modulation, per se reduces the power output of the magnetron to further reduce minimum modulation. This decoupling of the magnetron from its load may provide a bad carrier spectrum, and may cause damage to the magnetron, so that a further object of the present invention is to improve operation in these respects. To do so, a second branch line or the like is provided, diverted from the main line at a point between the first-mentioned branch to the modulator and the magnetron generator. This branch is spaced λ/4 or an odd multiple thereof from the junction of the main line and the first branch, and the second branch is preferably of an electrical length of λ/2 or an integral multiple thereof. The junction point between the main line and this second branch is preferably spaced an integral number of half-wavelengths from the magnetron. This second branch is terminated by a resistor of a value intermediate the minimum and maximum impedances appearing at the junction of the line and the absorption branch, during modulation, this resistor therefore constituting a shunt load. With this shunt load, the magnetron feeds into a smaller impedance during minimum modulation than would be the case without the shunt load, since such shunt load is in shunt with the very high impedance provided at the magnetron during minimum modulation by the absorption tube, decoupling is not so complete and the operational characteristics of the modulator are improved, particularly as regards magnetron spectrum.

In addition, the shunt load eliminates the high loaded "Q" resulting from decoupling the magnetron from its load, with its possible limitation upon the system band width. The operation of this circuit is still substantially the same as the operation in the absence of the second shunt branch, with the following difference. When the absorption tube beam is off, the short-circuit at the junction of the main line and the absorption branch, with its resultant high impedance at the magnetron, does not completely unload the magnetron, because the shunt load is still shunted across the main line in parallel with such high impedance. When the absorption tube beam is on, the low impedance seen by the magnetron, which approaches that of the load only for infinite beam current, is reduced somewhat further by the shunt load, since such load is shunted across such low impedance.

While it is believed that this invention will be understood by those skilled in the art from the brief description given above, the same will now be described in detail. In this description, reference will be made to the attached drawings, wherein:

Fig. 3 is a set of curves illustrating the operation of a modulation system without the shunt load of this invention;

Fig. 4 is a curve illustrating a characteristic feature of the operation of a system of the invention;

Figs. 5 and 6 are sets of curves corresponding to Figs. 2 and 3, respectively, but for a different circuit arrangement.

Figure 1:
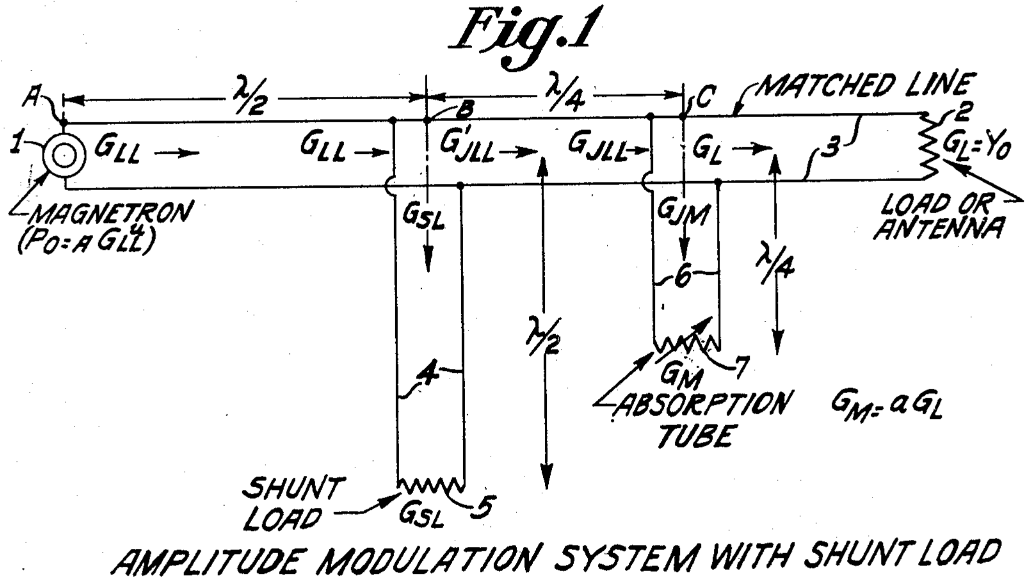
Fig. 1 is a schematic circuit diagram illustrating the essential features of a modulation system according to the invention.

Now referring to Fig. 1, a magnetron oscillator 1 is electrically connected to a suitable load 2, here represented by a resistance of conductance $G_L$, by means of a main transmission line 3 which extends horizontally in this figure and is represented by a pair of conductors. Point A is on line 3 at the output side of magnetron 1, while points B and C are spaced therealong between the magnetron and the useful load 2 which may, for example, be an antenna. The transmission line 3 is matched to the load 2, which may be a 52-ohm load, for example.

At junction point B, which is preferably spaced a distance of effectively a half-wavelength or an integral number of half-wavelengths (at the operating frequency) along the main line from the magnetron (in that a conductance at B is in shunt with the magnetron) one end of a shunt load branch transmission line 4 is connected to the main line. Line 4 preferably has a length of λ/2 or an integral number of half-wavelengths, and is terminated by a shunt load 5, which may be a resistance connected across line 4 at the end thereof remote from the main line 3. A shunt load conductance $G_{SL}$, on the order of 0.0025 mho for load 5, was found to be sufficiently high to accomplish the purposes of this invention, while resulting in only a slight decrease in the system power output. Due to the fact that shunt load branch line 4 is effectively λ/2 or an integral number of half-wavelengths long, the conductance or impedance of load 5 is not inverted at point B, but has the same value $G_{SL}$ thereat. This shunt load on the magnetron 1 will decrease the maximum power output of the system as compared to what it would be if such load were not present due to losses in such shunt load, but only by a relatively small amount. The advantages of such a load, to be detailed hereafter, far outweigh this slight drawback, however.

At junction point C, which is preferably spaced a distance which is effectively λ/4 or an odd number of quarter-wavelengths from point B on the load side thereof along main line 3, one end of an absorption branch transmission line 6 is connected to the main line. In the preferred embodiment, line 6 has a length of λ/4 or an odd number of quarter-wavelengths, but alternatively may have a length of λ/2 or an integral number of half-wavelengths. Branch line 6 is terminated by a spiral beam absorption tube of the type previously described, which consists essentially of a resonant cavity containing a grid-controlled modulating electron beam which is caused to describe a spiral path in such cavity. A suitable absorption tube is more particularly described and claimed in the copending application of Donal et al., Serial No. 757,755, filed June 28, 1947. The resonant cavity of this tube is coupled by a loop to coaxial branch line 6 and presents a conductance $G_M$ to this line, which conductance is represented in Fig. 1 by a resistance 7.

It is desired to be made clear that, although transmission lines 3, 4 and 6 are represented by two-wire lines in Fig. 1, this has been done only in order to simplify the illustration. Actually, all of these lines are preferably of the coaxial or concentric type, but they may also be wave guide type transmission lines.

When the branch line 6 is $\lambda/4$ in length, the conductance $G_M$ of absorption tube 7 has a value of $G_{JM}$ at point C, due to the impedance-inverting characteristics of such a line, while when line 6 is $\lambda/2$ in length, conductance $G_M$ is not inverted at point C. For the discussion immediately following, a length of $n\lambda/4$ (where $n$ is an odd integer) will be assumed for branch line 6. This is the length indicated in Fig. 1.

The length of the main line 3 from junction point C to load 2 is not critical, but it is repeated that line-to-load impedance matching should be provided.

The conductance $G_M$ can be made to be directly proportional to the beam current in the absorption tube 7, so that said conductance increases as the beam current increases. Maximum conductance $G_M$ means minimum conductance or maximum impedance at point C, and therefore maximum power in the load 2, so that the load power varies in the same direction as the beam current and as the grid voltage in the absorption tube. When the beam current in the absorption tube 7 is zero, $G_M$ is very low (on the order of 0.0008 mho), limited by losses in the cavity and tube. This results in what is substantially a short-circuit at junction C, reducing the power in the load 2 not only by short-circuiting it but also by presenting a very low conductance to the magnetron 1 ($G_M$ is spaced effectively an integral number of half-wavelengths from the magnetron) and reducing its efficiency. Thus, good depth of amplitude modulation is obtained.

Under these conditions, with zero beam current in the absorption tube and substantially a short-circuit at the junction point C, the magnetron 1 is not completely decoupled from its load 2 because of the presence of the fixed impedance of shunt load 5, effective at junction point B across main line 3 and the magnetron output in shunt with the high impedance resulting at point B from the action of the absorption tube. Therefore, the magnetron is kept operating in a more stable condition, thus preventing deterioration of the magnetron spectrum and preventing an undesired decrease of the system band width and also preventing possible injury or damage to the magnetron. At the same time, due to the value of the impedance of shunt load 5, which is made as high as possible to prevent excessive loading of the magnetron and excessive diversion of the output energy or power of the magnetron from the useful load 2, and which still is low enough to prevent substantially complete unloading of the magnetron under conditions of zero beam current in the absorption tube 7, only a very little depth of modulation and a very little proportion of the total output power are lost because of the presence of shunt load 5.

When the modulating beam in absorption tube 7 is biased on to increase the beam current in said tube, $G_M$ increases but $G_{JM}$ decreases. This in effect increases the impedance at junction point C, increasing the power in load 2 by effectively removing the short-circuit therefrom. If the beam current were infinite, giving infinite impedance at point C, the load power in main or useful load 2 would be approximately that of the magnetron into a matched load. Under these conditions of maximum power in useful load 2 and maximum impedance at point C, shunt load 5 diverts some of the total magnetron output power away from load 2, but the amount of such diversion is so small as to be almost negligible, and is in fact unimportant.

The expressions for the powers in the components of the circuit of Fig. 1 external to the modulating or absorption tube will now be derived in terms of $G_M$, the conductance presented to the line in said circuit. It is convenient to assume that in the region of operation the power output of the magnetron may be expressed by the relation $$P_0 = AG_{LL}^u \qquad (1)$$

where A is a constant, $G_{LL}$ is the conductance seen by the generator and $u$ is positive and less than unity. The validity of this assumption has been confirmed by experimental data on several tubes of different types. An average value of $u$ of 0.33 was found and has been employed here. Rather wide variations from this value for an individual tube would make no serious changes in the conclusions reached later concerning the modulation characteristics.

It is further assumed that $$G_M = \frac{G_m}{k^2} = aG_L = aY_0 \qquad (2)$$

and $$G_{SL} = \frac{G_L}{n} \qquad (3)$$

where $a$ and $n$ are constants, $n$ being the ratio of the useful load conductance to the shunt load conductance. $G_L$ is the conductance of the useful load, $Y_0$ is the characteristic admittance of the lines, $k$ is the coefficient of coupling between the resonant cavity and the line, and $G_m$ is the conductance of the beam inside the modulation tube.

From the circuit of Fig. 1, $$G_{JLL} = G_{JM} + G_L = \frac{Y_0^2}{G_M} + G_L$$

$$G'_{JLL} = \frac{Y_0^2}{G_{JLL}} = \frac{Y_0^2}{\frac{Y_0^2}{G_M} + G_L} = \left(\frac{a}{1+a}\right)G_L$$

$$G_{LL} = G_{SL} + G'_{JLL} = \frac{G_L}{n} + \frac{a}{1+a}G_L = \left[\frac{1}{n} + \frac{a}{1+a}\right]G_L \qquad (4)$$

From (1) and (4)

$$P_0 = A\left[\frac{1}{n} + \frac{a}{1+a}\right]^u G_L^u \qquad (5)$$

If the powers in the shunt load, the useful load and the modulation tube are represented by $P_{SL}$, $P_L$ and $P_M$, respectively, then $P_0 = P_{SL} + P_M + P_L$. But $$P_L = E_J^2 G_L \qquad (6)$$

where $E_J$ is the R.-F. voltage at the junction point C. Also, $$P_M = E_J^2 G_{JM} = \frac{E_J^2 Y_0^2}{G_M} \qquad (7)$$

Therefore:

$$\frac{P_L}{P_M} = \frac{E_J^2 G_L}{\frac{E_J^2 Y_0^2}{G_M}} = \frac{G_L G_M}{Y_0^2} = \frac{G_M}{G_L} = a \text{ (since } Y_0 = G_L) \qquad (8)$$

We will now derive an expression for $P_{SL}$ in terms of $P_0$.

$$P_L + P_M = E_K^2 G'_{JLL} = E_K^2 \left(\frac{a}{1+a}\right) G_L \qquad (9)$$

where $E_K$ is the R.-F. voltage at the junction point B. From (3)

$$P_{SL} = E_K^2 \frac{G_L}{n} \qquad (10)$$

Dividing (9) by (10), $$\frac{P_L + P_M}{P_{SL}} = \frac{E_K^2 \left(\frac{a}{1+a}\right) G_L}{E_K^2 \frac{G_L}{n}} = \frac{na}{1+a} \qquad (11)$$

From (11), $$P_0 = P_L + P_M + P_{SL} = \left(\frac{na}{1+a} + 1\right) P_{SL}$$

Therefore:

$$P_{SL} = P_0 \frac{1+a}{1+a(n+1)} \qquad (12)$$

We will now derive an expression for $P_M$ in terms of $P_0$. From (11)

$$P_0 = P_L + P_M + P_{SL} = P_L + P_M + \frac{P_L + P_M}{\frac{na}{1+a}}$$

From (8), $$P_0 = \frac{P_M G_M}{G_L} + P_M + \frac{\frac{P_M G_M}{G_L} + P_M}{\frac{na}{1+a}} = P_M \left[1 + a + \frac{1+a}{\frac{na}{1+a}}\right]$$

Therefore:

$$P_M = P_0 \frac{na}{(1+a)[1+a(n+1)]} \qquad (13)$$

We will now derive an expression for $P_L$ in terms of $P_0$. From Equations 8 and 11, $$P_0 = P_L + P_M + P_{SL} = P_L + \frac{G_L}{G_M} \cdot P_L + \frac{P_L + \frac{G_L}{G_M} \cdot P_L}{\frac{na}{1+a}}$$

From Equation 8

$$P_0 = \left(\frac{1+a}{a}\right) P_L + \frac{\left(\frac{1+a}{a}\right) P_L}{\frac{na}{1+a}} = P_L \left[\frac{n + \left(\frac{1+a}{a}\right)}{\frac{na}{1+a}}\right]$$

Therefore:

$$P_L = P_0 \frac{na^2}{(1+a)[1+a(n+1)]} \qquad (14)$$

It is convenient to plot the ratios of the powers to the power output of the magnetron into a matched load, for the ordinates of the curves are then independent of the latter power. Since the output into a matched load is $$P_{00} = A G_{LL}^u = A G_L^u \qquad (15)$$

Equation 5 becomes $$\frac{P_0}{P_{00}} = \left[\frac{1}{n} + \frac{a}{1+a}\right]^u \qquad (16)$$

Using Equations 12, 13, 14 and 16, the ratios of $P_0$, $P_M$, $P_L$ and $P_{SL}$ to $P_{00}$ may be computed. These values are shown plotted in Fig. 2 for a value of $n$ of 8. It will be noted from this figure that when the modulating tube conductance is zero (when $a$ is zero), the relative output $P_0$ of the magnetron is 0.5. The output of the magnetron is increased for all values of $a$ by the presence of the shunt load (for very high values of $a$ it is greater than $P_{00}$), with the result that the useful power in the load is not decreased, by the presence of the shunt load, as much as would otherwise be the case.

We will now consider the conditions that obtain when the shunt load 5 of Fig. 1 is eliminated. Either a development similar to the preceding, or allowing $n$ to become infinite in Equations 5, 13, and 14, yields the following expressions for the powers:

$$P_0 = A\left[\frac{a}{1+a}\right]^u G_L^u \qquad (17)$$

$$P_M = \left[\frac{a}{1+a}\right] P_0 \qquad (18)$$

$$P_L = \left[\frac{a}{1+a}\right] P_0 \qquad (19)$$

Equation 16, above, becomes $$\frac{P_0}{P_{00}} = \left[\frac{a}{1+a}\right]^u \qquad (20)$$

For the value of $u$ of 0.33 used previously, the ratios of $P_0$, $P_M$ and $P_L$ to $P_{00}$ may be computed and are shown plotted in Fig. 3. From a comparison of Equation 5 with 17, and Fig. 2 with Fig. 3, it is to be noted that the magnetron output power $P_0$ is increased for each value of $a$ by the addition of the shunt load. Therefore, $P_L$ is not decreased as much as would be expected, by the addition of a shunt load, from a comparison of the parametric terms of Equations 14 and 19. From the curves, when $a=1.8$, $P_L$ is decreased only slightly, from 55% of the matched load output of the magnetron when $n=\infty$ to about 50% when a shunt load of 400 ohms is used ($n=8$).

Figure 2:
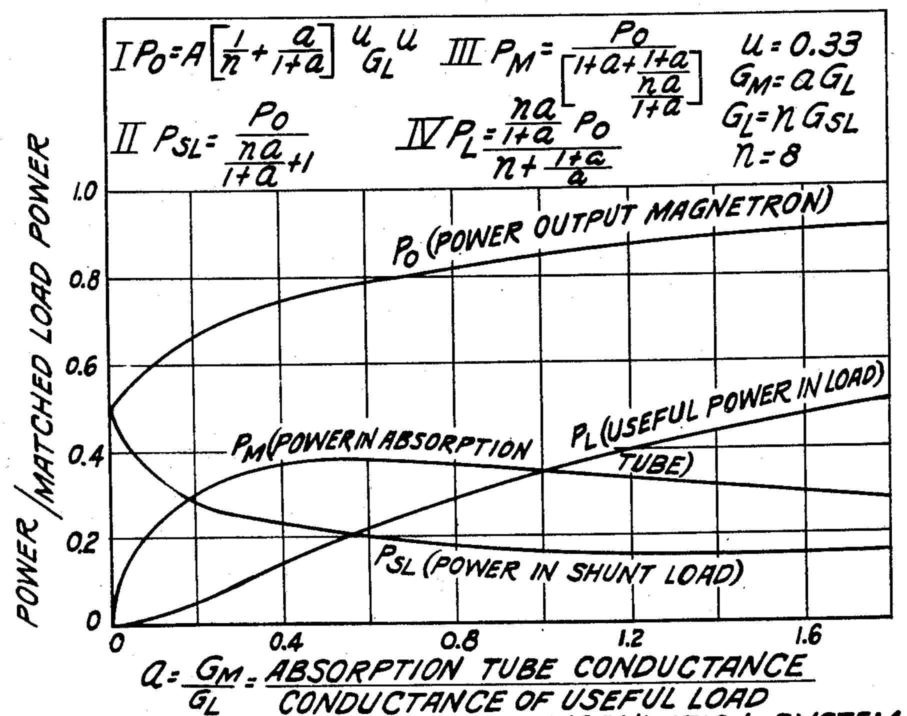
Fig. 2 is a set of curves illustrating the operation of the invention.

From a comparison of Figs. 2 and 3, it may be seen that when $a$ is zero, or when the modulating tube conductance is zero, the relative output $P_0$ of the magnetron is 0.5 when the shunt load is used, and is zero when a shunt load is not used. Thus, the magnetron is not completely decoupled from its load under this modulation condition when a shunt load is used, thereby providing the desirable advantages previously discussed, of improved band width and spectrum.

In Fig. 2, it may be seen that over the useful range the useful relative power $P_L$ varies from about 2% of the relative magnetron power $P_0$ to about 60% of said magnetron output power, thus providing a depth of voltage modulation, from the peaks, of at least 85%.

To summarize the operation of the system so far described, a pair of electrons spiraling in a longitudinal magnetic field varies the conductance presented by a resonant cavity coupled to the magnetron and to the system load. Grid control of the beam current modulates the power in the load by varying the conductance in shunt with the load, as well as varying the efficiency of the magnetron. A shunt load is provided between the magnetron and the absorption tube, to prevent complete decoupling of the magnetron and the absorption tube, to prevent complete decoupling of the magnetron from its load under conditions of minimum modulation.

The linearity of the system is good, the bandwidth is at least 20 megacycles, and peak voltage may be modulated down at least 85%. The necessary power consumed in the output of the modulator is only about ½ watt.

The degree of linearity of the system, that is, the linearity of the square root of the power output versus the control grid voltage, has been determined for manual control of the bias, for 60 cycle modulation and for several modulation frequencies in the range from 1 megacycle to 20 megacycles. A representative result at the higher frequencies is shown in Fig. 4, where the depth of modulation, for a constant direct current grid bias, is plotted against the R. M. S. grid volts. Within the probable error of the results, the characteristic is linear up to about 85% voltage modulation; this is the maximum obtainable modulation, limited by losses as explained earlier.

Up to this point, it has been assumed that the length of the transmission line 6 from absorption tube 7 to junction point C is a quarter-wavelength. We will now consider the changes produced in the system when absorption branch line 6 is a half-wavelength long.

The circuit of Fig. 1 develops in the system load 2 for practical values of beam current, 50% to 60% of the matched-load power output of the magnetron. Since it would be desirable to increase this relative output, the use of a half-wave transformer or transmission line 6 between the modulation tube 7 and the junction point C was investigated.

With this change in impedance transformation, a derivation similar to that given hereinabove results in the following relations:

$$P_0=A\left[\frac{1}{n}+\frac{1}{1+a}\right]^{*}G_L^{*} \qquad (21)$$

$$P_{SL}=P_0\frac{1+a}{a+n+1} \qquad (22)$$

$$P_M=P_0\frac{na}{(1+a)(a+n+1)} \qquad (23)$$

$$P_L=P_0\frac{n}{(1+a)(a+n+1)} \qquad (24)$$

Using Equation 15 above, and $u$ and $n$ equal to 0.33 and 8, respectively, the ratios of $P_0$, $P_{SL}$, $P_M$ and $P_L$ to $P_{00}$ were computed and are plotted in Fig. 5. The maximum useful load power is 88% of the matched-load output of the magnetron, a distinct improvement over the power attainable (Fig. 2) for a reasonable maximum value of $a$ (about 1.8) with the quarter-wave transformation. However, for $a=1.8$, Fig. 5 shows the load power to be reduced to about 20% of $P_{00}$. This corresponds to a maximum of only about 52% voltage modulation of the 88% power level; the performance of the system would be inadequate for many types of service.

If the shunt load is eliminated but the half-wave transformer is still used between the absorption tube and the junction point C of Fig. 1, Equations 21, 23 and 24 reduce to the expressions $$P_0=A\left[\frac{1}{1+a}\right]^{*}G_L^{*} \qquad (25)$$

$$P_M=P_0\frac{1}{1+a} \qquad (26)$$

$$P_L=P_0\frac{1}{1+a} \qquad (27)$$

Figure 6:
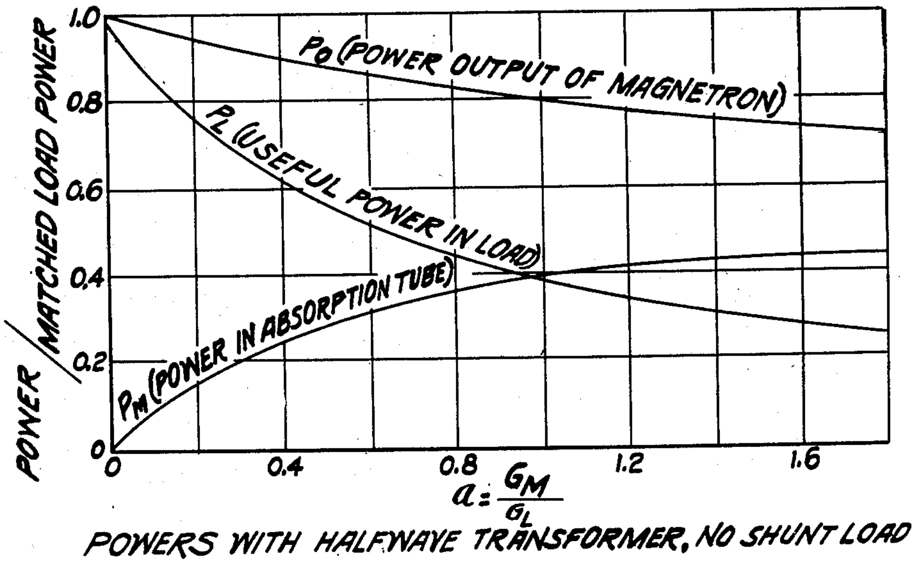

Using Equation 15 above, the ratios of $P_0$, $P_M$ and $P_L$ to $P_{00}$ were calculated and are plotted in Fig. 6. The attainable depth of modulation ($a$ about 1.8) is even less satisfactory than that shown in Fig. 5, although the maximum power in the load would be the full matched-load power of the magnetron if the losses were negligible.

When the transmission line 6 is a half-wavelength or an integral number of half-wavelengths long, the maximum power $P_L$ into the load occurs at zero beam current in the absorption tube, since under this condition the conductances at the absorption tube and at the junction point C are substantially zero. From Fig. 5, it may be seen that the maximum power $P_L$ into the load, occurring at zero beam current under these conditions, is nearly that of the magnetron into a matched load (an intercept on the vertical axis of nearly one), but for practical values of beam current the depth of modulation is very poor, probably only 50% or 60% in voltage, as described above. The depth of modulation is similarly poor when the shunt load is eliminated and the half-wave transformer still used. See Fig. 6. Thus, it is considered preferable, for the purposes of the present invention, to make the absorption branch line 6 a quarter-wavelength rather than a half-wavelength long, from the absorption tube 7 to junction point C.

In the above-mentioned Donal et al. application, it was disclosed that a separate spiraling electron beam could be used to control the average carrier frequency of the system during amplitude modulation. There will now be discussed a procedure for achieving the maintenance of constant carrier frequency during the amplitude modulation cycle. Since the electron beam of the modulating tube presents a pure conductance, the circuit of Fig. 1 presents a pure conductance to the magnetron. If the Rieke diagram of the magnetron is ideal, in that a frequency contour lies along the zero reactance line, no frequency change occurs during the modulation cycle. In practical cases, the Rieke diagram is not usually ideal, however, and the frequency shifts during the modulation cycle, although the shunt load decreases the range of impedance seen by the magnetron, and hence decreases the frequency change to be corrected. In order to minimize the frequency variation the length of main transmission line 3 between the junction point C and the magnetron at point A is adjusted, with the beam of the modulator tube off, until the impedance presented to the magnetron lies on the same frequency contour as the impedance presented with the beam at its maximum value. It is not necessary to alter the line length when modulation or absorption tubes are replaced. This easy adjustment gives the same frequency at the end points of the modulation cycle, and may be termed end-point compensation by line-length adjustment. The manner in which this adjustment may be made will become clearer as the description proceeds.

Figure 7:
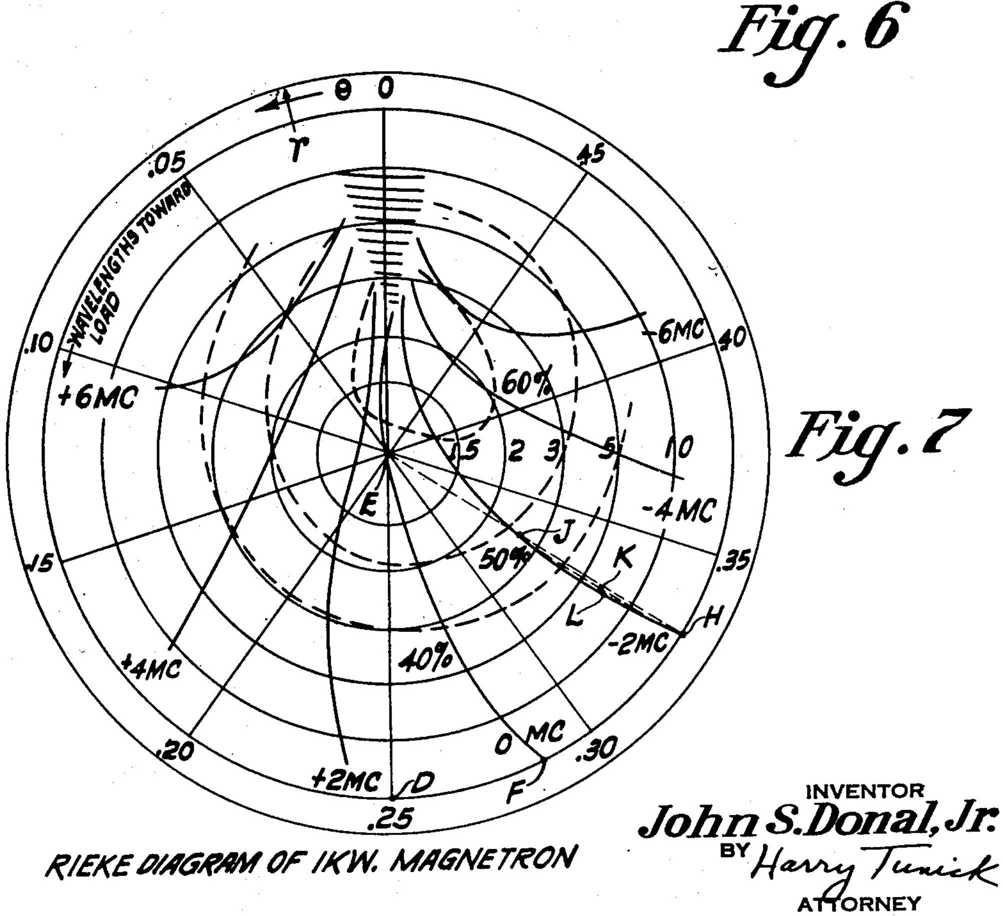
Fig. 7 is a Rieke diagram of a magnetron, useful in explaining one feature of the invention.

In Fig. 7, representing the Rieke diagram of the magnetron, D is the point of substantially infinite resistance and zero reactance presented to the magnetron. If the lengths of branch line 6 and of main line 3 between points A and C are both $\lambda/4$, or an odd number of quarter-wavelengths, the magnetron will see point D with beam current zero. As the beam current is increased, with a magnetic field equal to $\omega_0 m/e$ (where $\omega_0$ is $2\pi$ times the carrier frequency), the magnetron sees points along the line DE, match point E being approached for only an infinite beam. If the frequency contour passing through E is coincident with line DE, there will be no frequency change during the modulation cycle.

In general, the frequency contour passing through E is curved and passes through some point such as F, so the frequency will vary as the magnetron sees loads along line DE. The following method has been devised for adjusting the line length to make the frequency with beam off equal that with a beam of substantially infinite strength. Note that with the beam off, and the absorption tube cavity untuned, the resistance at the junction C of Fig. 1 (due to the absorption tube) is nearly infinite. Therefore, the magnetron sees a matched load and the frequency is independent of the length of transmission line AC (Fig. 1). According to this invention, it is proposed that for two different lengths of transmission line AC, the frequency be plotted as a function of length of branch line 6. Where the two curves coincide is the correct length ($\lambda/4$) of transmission line 6, and the magnetron sees point E of Fig. 7. The cavity is next tuned to resonance. The magnetron now sees point D of Fig. 7, if transmission line AC is $\lambda/4$ or an odd number of quarter-wavelengths long.

However, line AC is next adjusted until the frequency with the cavity tuned is equal to that obtained with the cavity untuned. In Fig. 7, then, the magnetron sees point F (cavity tuned) and point E (cavity untuned); end-point compensation for zero and infinite beam is thus obtained.

For normal maximum values of beam current, the magnetron will never see point E, but as the beam is increased, the magnetron will see points on a straight line from F through E. According to this invention, in this case the length of line AC is readjusted until the magnetron sees point H (beam off) and point J on the straight line HE (with beam on). This also gives end-point compensation. This method gives exact equality of the end-point frequencies, to better than 0.01 megacycle on 800 megacycles. The compensation may also be accomplished by slight readjustments of the length of line 6. With the adjustment described, the frequency variation during the amplitude modulation cycle is usually less than $\pm 15$ kilocycles at 900 megacycles.

Assuming that the length of line 4 is $\lambda/4$, and that of line 3 from point A to point B is not quite correct to give a path HJ of Fig. 7, exact end-point compensation has been obtained by changing the value of magnetic field on the absorption tube from $\omega_0 m/e$ to a value slightly different, yet still affording nearly maximum system power output. This arises from the fact that, for values of magnetic field different from $\omega_0 m/e$ the absorption presents a reactance which is an increasing function of beam current and, if the magnetic field is adjusted in a direction to make this reactance of the correct sign, the magnetron will again see the point J in Fig. 7 instead of a point on a slightly different frequency contour.

End-point compensation has also been obtained by a combination of adjustment of line lengths and adjustment of magnetic field.

Since the path on the Rieke diagram was found to be a curve such as HKJ of Fig. 7, when there is end-point compensation by line lengths and the magnetic field differs from $\omega_0 m/e$, this observation may be taken advantage of to correct the frequency change during the modulation cycle. Thus, the magnetic field may be adjusted, from $\omega_0 m/e$, in such a direction that the curvature is in the same direction as the frequency contour HLJ of Fig. 7. When this is done, there is no significant loss in system power output. By this means the maximum change in frequency, from any portion of the modulation cycle to any other portion, was reduced to $0.02 \pm 0.02$ megacycle at 800 megacycles.

What is claimed is:

1. In a modulation system, a first transmission line, an oscillation generator coupled to one end of said line, a useful load coupled to the other end of said line, a second transmission line, a connection between one end of said second line and said first line, an absorption-type tube coupled to the other end of said second line, means for varying the effective impedance of said tube in accordance with signals to amplitude modulate the output of said generator, a third transmission line coupled at one end to said first line, and a shunt load shunting the other end of said third line, said shunt load having an impedance intermediate the maximum and minimum impedances of said tube during modulation.

2. In a modulation system, a first transmission line, an oscillation generator coupled to one end of said line, a useful load coupled to the other end of said line, a second transmission line, a connection between one end of said second line and said first line, an absorption-type tube coupled to the other end of said second line, means for varying the effective impedance of said tube in accordance with signals to amplitude modulate the output of said generator, a third transmission line coupled at one end to said first line between said generator and said second line, and a shunt load shunting the other end of said third line, said shunt load having an impedance intermediate the maximum and minimum impedances of said tube during modulation.

3. In a modulation system, a first transmission line, a magnetron oscillation generator having an internal resonant circuit coupled to one end of said line, a useful load coupled to the other end of said line, a second transmission line, a connection between one end of said second line and said first line, an absorption-type tube coupled to the other end of said second line, means for varying the effective impedance of said tube in accordance with signals to amplitude-modulate the output of said magnetron, a third transmission line coupled at one end to said first line, and a shunt load shunting the other end of said third line, said shunt load having an impedance intermediate the maximum and minimum impedances of said tube during modulation.

4. In a modulation system, a first transmission line, an oscillation generator coupled to one end of said line, a useful load coupled to the other end of said line, a second transmission line, a connection between one end of said second line and said first line, an absorption-type tube coupled to the other end of said second line, means for varying the effective impedance of said tube in accordance with signals to amplitude modulate the output of said generator, a third transmission line coupled at one end to said first line, and a shunt load shunting the other end of said third line, said shunt load having an impedance which is intermediate the maximum and minimum impedances of said tube during modulation and which is several times as large as the effective impedance of said useful load.

5. In a modulation system, a first transmission line, an oscillation generator coupled to one end of said line, a useful load coupled to the other end of said line, a second transmission line, a connection between one end of said second line and said first line at a point $\lambda/4$ $(2n+1)$ from said generator, where $\lambda$ is the wavelength at the operating frequency of said generator and $n$ is an integer greater than zero, an absorption-type tube coupled to the other end of said second line, means for varying the effective impedance of said tube in accordance with signals to amplitude modulate the output of said generator, a third transmission line coupled at one end to said first line at a point an odd number of quarter-wavelengths from the connection between said first and second lines, and a shunt load shunting the other end of said third line, said shunt load having an impedance intermediate the maximum and minimum impedances of said tube during modulation.

6. In a modulation system, a first transmission line, an oscillation generator coupled to one end of said line, a useful load coupled to the other end of said line, a second transmission line, a connection between one end of said second line and said first line at a point $\lambda/4$ $(2n+1)$ from said generator, where $\lambda$ is the wavelength at the operating frequency of said generator and $n$ is an integer greater than zero, an absorption-type tube coupled to the other end of said second line, means for varying the effective impedance of said tube in accordance with signals to amplitude modulate the output of said generator, a third transmission line coupled at one end to said first line between said generator and said second line at a point an odd number of quarter-wavelengths from the connection between said first and second lines, and a shunt load shunting the other end of said third line, said shunt load having an impedance intermediate the maximum and minimum impedances of said tube during modulation.

7. In a modulation system, a first transmission line, an oscillation generator coupled to one end of said line, a useful load coupled to the other end of said line, a second transmission line, a connection between one end of said second line and said first line, an absorption-type tube coupled to the other end of said second line at a distance of $\lambda/4$ from said first line, where $\lambda$ is the wavelength at the operating frequency of said generator, means for varying the effective impedance of said tube in accordance with signals to amplitude modulate the output of said generator, a third transmission line coupled at one end to said first line, and a shunt load shunting the other end of said third line, said shunt load having an impedance intermediate the maximum and minimum impedances of said tube during modulation.

8. In a modulation system, a first transmission line, an oscillation generator coupled to one end of said line, a useful load coupled to the other end of said line, a second transmission line, a connection between one end of said second line and said first line, an absorption-type tube coupled to the other end of said second line at a distance of $\lambda/2$ from said first line, where $\lambda$ is the wavelength at the operating frequency of said generator, means for varying the effective impedance of said tube in accordance with signals to amplitude modulate the output of said generator, a third transmission line coupled at one end to said first line, and a shunt load shunting the other end of said third line, said shunt load having an impedance intermediate the maximum and minimum impedances of said tube during modulation.

9. In a modulation system, a first transmission line, an oscillation generator coupled to one end of said line, a useful load coupled to the other end of said line, a second transmission line, a connection between one end of said second line and said first line, an absorption-type tube coupled to the other end of said second line at a distance of $\lambda/4$ from said first line, where $\lambda$ is the wavelength at the operating frequency of said generator, means for varying the effective impedance of said tube in accordance with signals to amplitude modulate the output of said generator, a third transmission line coupled at one end to said first line, and a shunt load shunting the other end of said third line, said shunt load having an impedance which is intermediate the maximum and minimum impedances of said tube during modulation and which is several times as large as the effective impedance of said useful load.

10. In a modulation system, a first transmission line, an oscillation generator coupled to one end of said line, a useful load coupled to the other end of said line, a second transmission line, a connection between one end of said second line and said first line, an absorption-type tube coupled to the other end of said second line, means for varying the effective impedance of said tube in accordance with signals to amplitude modulate the output of said generator, a third transmission line coupled at one end to said first line, and a shunt load shunting the other end of said third line at a point $\lambda/2$ from the coupling of said first and third lines, where $\lambda$ is the wavelength at the operating frequency of said generator, said shunt load having an impedance intermediate the maximum and minimum impedances of said tube during modulation.

11. In a modulation system, a first transmission line, a magnetron oscillation generator having an internal resonant circuit coupled to one end of said line, a useful load coupled to the other end of said line, a second transmission line, a connection between one end of said second line and said first line, an absorption-type tube coupled to the other end of said second line at a distance of $\lambda/4$ from said first line, where $\lambda$ is the wavelength at the resonant frequency of said resonant circuit, means for varying the effective impedance of said tube in accordance with signals to amplitude modulate the output of said magnetron, a third transmission line coupled at one end to said first line, and a shunt load shunting the other end of said third line, said shunt load having an impedance which is intermediate the maximum and minimum impedances of said tube during modulation and which is several times as large as the effective impedance of said useful load.

12. In a modulation system, a first transmission line, an oscillation generator coupled to one end of said line, a useful load coupled to the other end of said line, a second transmission line, a connection between one end of said second line and said first line, an absorption-type tube coupled to the other end of said second line at a distance of $\lambda/4$ from said first line, where $\lambda$ is the wavelength at the operating frequency of said generator, means for varying the effective impedance of said tube in accordance with signals to amplitude modulate the output of said generator, a third transmission line coupled at one end to said first line, and a shunt load shunting the other end of said third line at a point $\lambda/2$ from the coupling of said first and third lines, said shunt load having an impedance intermediate the maximum and minimum impedances of said tube during modulation.

13. In a modulation system, a first transmission line, an oscillation generator coupled to one end of said line, a useful load coupled to the other end of said line, a second transmission line, a connection between one end of said second line and said first line at a point $\lambda/4\ (2n+1)$ from said generator, where $\lambda$ is the wavelength at the operating frequency of said generator and $n$ is an integer greater than zero, an absorption-type tube coupled to the other end of said second line at a distance of $\lambda/4$ from said first line, means for varying the effective impedance of said tube in accordance with signals to amplitude modulate the output of said generator, a third transmission line coupled at one end to said first line at a point an odd number of quarter-wavelengths from the connection between said first and second lines, and a shunt load shunting the other end of said third line, said shunt load having an impedance intermediate the maximum and minimum impedances of said tube during modulation.

14. In a modulation system, a first transmission line, an oscillation generator coupled to one end of said line, a useful load coupled to the other end of said line, a second transmission line, a connection between one end of said second line and said first line at a point $\lambda/4\ (2n+1)$ from said generator, where $\lambda$ is the wavelength at the operating frequency of said generator and $n$ is an integer greater than zero, an absorption-type tube coupled to the other end of said second line, means for varying the effective impedance of said tube in accordance with signals to amplitude modulate the output of said generator, a third transmission line coupled at one end to said first line at a point an odd number of quarter-wavelengths from the connection between said first and second lines, and a shunt load shunting the other end of said third line at a point $\lambda/2$ from the coupling of said first and third lines, said shunt load having an impedance intermediate the maximum and minimum impedances of said tube during modulation.

15. In a modulation system, a first transmission line, an oscillation generator coupled to one end of said line, a useful load coupled to the other end of said line, a second transmission line, a connection between one end of said second line and said first line at a point $\lambda/4\ (2n+1)$ from said generator, where $\lambda$ is the wavelength at the operating frequency of said generator and $n$ is an integer greater than zero, an absorption-type tube coupled to the other end of said second line at a distance of $\lambda/4$ from said first line, means for varying the effective impedance of said tube in accordance with signals to amplitude modulate the output of said generator, a third transmission line coupled at one end to said first line at a point an odd number of quarter-wavelengths from the connection between said first and second lines, and a shunt load shunting the other end of said third line at a point $\lambda/2$ from the coupling of said first and third lines, said shunt load having an impedance intermediate the maximum and minimum impedances of said tube during modulation.

16. In a modulation system, a first transmission line, an oscillation generator coupled to one end of said line, a useful load coupled to the other end of said line, a second transmission line, a connection between one end of said second line and said first line at a point $\lambda/4\ (2n+1)$ from said generator, where $\lambda$ is the wavelength at the operating frequency of said generator and $n$ is an integer greater than zero, an absorption-type tube coupled to the other end of said second line at a distance of $\lambda/4$ from said first line, means for varying the effective impedance of said tube in accordance with signals to amplitude modulate the output of said generator, a third transmission line coupled at one end to said first line between said generator and said second line at a point an odd number of quarter-wavelengths from the connection between said first and second lines, and a shunt load shunting the other end of said third line at a point $\lambda/2$ from the coupling of said first and third lines, said shunt load having an impedance intermediate the maximum and minimum impedances of said tube during modulation.

JOHN S. DONAL, Jr.

REFERENCES CITED

The following references are of record in the file of this patent:

UNITED STATES PATENTS

| Number | Name | Date |
|---|---|---|
| 1,909,610 | Carter | May 16, 1933 |
| 2,198,025 | Davies et al. | Apr. 23, 1940 |
| 2,212,214 | Smith | Aug. 20, 1940 |
| 2,223,058 | Christ | Nov. 26, 1940 |
| 2,419,985 | Brown | May 6, 1947 |